Patented Sept. 18, 1945

2,384,881

UNITED STATES PATENT OFFICE 2,384,881

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941, Serial No. 403,013

3 Claims. (Cl. 260—42)

This invention relates to thermoplastic compositions comprising polymeric vinylidene chloride products modified with coumarone-indene resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

Coumarone-indene resins are the products obtained by polymerizing a mixture of coumarone and indene or by polymerizing fractions of solvent naphtha rich in coumarone and indene. The resins vary from viscous liquids to hard brittle solids having a melting point of 130° C. or above. They are graded according to melting or softening point and subdivided according to color. The resins are neutral, almost completely non-saponifiable, and are resistant to water, acids, and alkalies. Modified resins are prepared by polymerizing a mixture of monomeric coumarone and indene in the presence of phenols, whereby phenolic bodies participate in the reaction and yield resins which are soluble in alcohol. Another method of modifying the resins is by hydrogenating the coumarone-indene polymers in the presence of a catalyst, whereby resins are obtained which are described as cycloparaffin resins. These hydrogenated resins are characterized by being more compatible with aliphatic hydrocarbons, by their pale straw to water-white color, and by relatively greater stability to ultra-violet light than are the conventional coumarone-indene resins.

The coumarone-indene resins herein employed are those resins obtained by polymerizing a mixture of coumarone and indene in the presence, or not, of a phenolic body, and the hydrogenated coumarone-indene polymers described as cycloparaffin resins. For purposes of simplicity these resins are hereinafter referred to as coumarone-indene resins.

According to the present invention, coumarone-indene resins are incorporated with a polymeric vinylidene chloride product to produce a mass which can be molded or extruded to form articles having a waxy "handle" and high gloss. For example, a coumarone-indene resin may be incorporated with a polymeric vinylidene chloride product having a softening point only slightly below its decomposition point to produce a mass that can be extruded at relatively low temperatures and pressures to form valuable articles, threads, bands, filaments, foils, and the like, which retain the high tensile strength and toughness shown by the parent polymeric vinylidene chloride product. Furthermore, addition of coumarone-indene resins to a polymeric vinylidene chloride product, in many cases, has a plasticizing effect, particularly at elevated temperatures, and produces a mass that has thermoplastic properties superior to the polymeric vinylidene chloride product alone, and may be molded or shaped to form useful articles having a tough, durable finish with a high gloss, and which retain a resistance to chemicals typical of polymeric vinylidene chloride products.

The addition of the coumarone-indene resins to the polymeric vinylidene chloride product may be effected by any of several methods. For example, the polymeric vinylidene chloride product and the particular coumarone-indene resin to be employed may be mixed or ground together in a ball mill or other suitable mixer commonly employed in the plastic art, or they may be added to the polymer on hot rolls in a method similar to compounding rubber compositions. Another satisfactory method of incorporating the coumarone-indene resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

2.5 grams of Cumar W-½, a coumarone-indene resin having a melting point of 112°–114° C., and 5.0 grams of 1,2-epoxy-3-(2-phenylphenoxy) propane, to serve as a heat stabilizer, were incorporated with 20 milliliters of benzene. To this solution was added 42.5 grams of a co-polymer composed of 90 per cent vinylidene chloride and 10 per cent vinyl chloride. The mixture was ground until thoroughly blended, and then dried. The composition could easily be molded or extruded, and filaments having a diameter of 0.014 inch, prepared from this material, were found to be tough, flexible, and to have a soft, waxy handle, and a tensile strength above 25,000 pounds per square inch.

Example 2

2.5 grams of Coumar MH 1-½, a coumarone-indene resin having a melting point of 89°–92° C., and 5.0 grams of 1,2-epoxy-3-(2-phenylphenoxy) propane were incorporated with 18 milliliters of benzene. To the resulting product was added 42.5 grams of a co-polymer consisting of 90 per cent vinylidene chloride and 10 per cent vinyl chloride. The mixture was ground until thoroughly blended, and then dried. The composition could easily be molded or extruded and filaments having a diameter of 0.0124 inch, prepared from this material, were found to be tough, flexible threads with a soft waxy handle, a glossy appearance, and a tensile strength above 40,000 pounds per square inch.

Example 3

A composition was prepared in a like manner to Example 1 but substituting Nevillac Hard, a phenol modified coumarone-indene resin having a melting point of 52°–62° C., for the Cumar W-½. The composition could easily be molded or extruded and filaments having a diameter of 0.0125 inch, prepared from this material were tough, flexible, glossy threads with a soft waxy handle, and a tensile strength above 35,000 pounds per square inch. It is useful in weaving fabrics, belts, bands, seat covers, or other articles.

Example 4

A composition was prepared in a like manner to Example 1, but substituting Neville R-27, a liquid coumarone-indene resin, for the Cumar W-½. The composition could easily be molded or extruded and filaments having a diameter of 0.015 inch, prepared from this material were tough, flexible threads with a glossy surface, a soft waxy handle and a tensile strength above 35,000 pounds per square inch.

Example 5

2.5 grams of Nevillite No. 1, a cycloparaffin resin having a melting point of 145°–155° C., and 5.0 grams of di-(alpha-phenylethyl) ether, to serve as a heat stabilizer, were incorporated with 20 milliliters of benzene. To this solution was added 42.5 grams of a co-polymer consisting of 90 per cent vinylidene chloride. The mixture was ground until thoroughly blended and then dried. The composition could easily be molded or extruded and filaments, having a diameter of 0.015 inch prepared from this material were flexible, tough threads with a waxy handle and had a tensile strength above 30,000 pounds per square inch.

Example 6

A composition was prepared in a like manner to Example 5 but using 0.5 gram of Nevillite No. 1, 5.0 grams of di-(alpha-phenylethyl) ether and 44.5 grams of the co-polymer. The composition could easily be molded or extruded and filaments having a diameter of 0.0175 inch prepared from this material were flexible, glossy threads and had a tensile strength above 29,000 pounds per square inch.

Example 7

A composition was prepared in a like manner to Example 5 but using 5.0 grams of Nevillite No. 1, 5.0 grams of di-(alpha-phenylethyl) ether and 40.0 grams of the copolymer. The composition could easily be molded or extruded and filaments having a diameter of 0.014 inch prepared from this material were flexible, tough threads, with a waxy handle and had a tensile strength above 31,000 pounds per square inch.

Example 8

2.5 grams of Nevillite "V", a cycloparaffin resin having a melting point of 103°–108° C., and 5.0 grams of 1,2-epoxy-3-(2-phenylphenoxy) propane, to serve as a heat stabilizer, were incorporated with 20 milliliters of acetone. To this solution was added 42.5 grams of co-polymer consisting of 90 per cent vinylidene chloride and 10 per cent vinyl chloride. The mixture was ground until thoroughly blended and then dried. The composition could easily be molded or extruded and filaments having a diameter of 0.0125 inch prepared from this material were translucent, flexible, glossy threads and had a tensile strength above 44,000 pounds per square inch.

Example 9

3.0 grams of Neville R-27, a liquid coumarone-indene resin and 2.0 grams of a co-polymer consisting of 90 per cent vinylidene chloride and 10 per cent vinyl chloride were placed in a test tube and heated to a fusion temperature. The product was a homogeneous, soft wax-like, non-sticky solid.

Example 10

4.5 grams of Cumar W-½, a coumarone-indene resin having a melting point of 112°–114° C., and 0.5 gram of a co-polymer consisting of 90 per cent vinylidene chloride and 10 per cent vinyl chloride were placed in a test tube and heated at about 165° C. until the mixture was fused. The product was an amber colored, brittle, homogeneous mass.

Example 11

3.75 grams of Nevillite No. 1, a cycloparaffin resin having a melting point of 145°–155° C., and 1.25 grams of a co-polymer consisting of 90 per cent vinylidene chloride and 10 per cent vinyl chloride were placed in a test tube and heated to a fusion temperature. The product was a homogeneous, brittle mass and had a light amber color.

The compositions which contain relatively low proportions of the coumarone-indene resins have improved molding and extruding properties, while the compositions which contain relatively large proportions of the resins will, depending upon the type of coumarone-indene resin used, range from soft semi-solids to hard brittle masses. The latter compositions may be advantageously used in preparing improved lacquers, varnishes or paints.

The proportion of coumarone-indene resins to be employed in the new polymeric vinylidene chloride product compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils or filaments should have high flexibility at all temperatures met in service and be sufficiently hard and tough enough to withstand abrasion. Similarly, lacquer coatings must be hard, tough and possess good flexibility. The exact proportions of the coumarone-indene resin to be employed in preparing the new compositions will vary with the use requirements. When the product is to be molded or extruded to form useful articles, threads, bands, filaments, foils and the like, the amount of the coumarone-indene resin used will ordinarily vary from about 0.5 to about 40 per cent, and more specifically between about 2 and about 7.5 per cent, based on the weight of the polymeric vinylidene chloride product used. When, however, it is desired to produce a composition which is substantially more compatible with many of the commonly used lacquer solvents the amount of coumarone-indene resin employed may vary from about 10 to about 90 per cent.

While the above examples show the preparation of compositions from a polymeric vinylidene chloride product consisting of a co-polymer of 90 per cent vinylidene chloride and 10 per cent vinyl chloride, incorporated with coumarone-indene resins, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenylphenoxy) propane, allyl-disulfide, 2-chloroallyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful and desirable when used in such amounts that the desirable mechanical properties of the product are not affected.

As will be seen from the above description, the properties of polymeric vinylidene chloride products can be varied widely, according to the amount and type of coumarone-indene resin incorporated therein, to produce products that are useful in the preparation of articles of all kinds. The herein described compositions, have among others, the following advantages: (1) they have low molding and softening temperatures well below their thermal decomposition temperatures, (2) they may be molded or extruded at relatively low pressure to form valuable articles, filaments, threads, bands, or foils, (3) they are substantially more compatible with many lacquer solvents than the polymer vinylidene chloride product alone, (4) and they are heat stable masses which may be worked to produce articles having a tough, durable, and glossy finish.

Other modes of applying the principle of our invention may be employed instead of those explained, change being made as regards the materials employed, provided the product recited in the following claims be obtained.

We therefore point out and distinctly claim as our invention:

1. A thermoplastic composition the essential ingredients of which are a copolymer of from about 5 to about 30 per cent of vinyl chloride and correspondingly from about 95 to about 70 per cent of vinylidene chloride, and from about 2 to about 7.5 per cent of a coumarone-indene resin based on the weight of the copolymer.

2. A thermoplastic composition, the essential ingredients of which are a polymer of vinylidene chloride, wherein the vinylidene chloride constitutes at least 70 per cent of the polymer, and from about 0.5 to about 40 per cent, based on the weight of the polymer, of a coumarone indene resin.

3. A thermoplastic composition, the essential ingredients of which are a polymer of vinylidene chloride, wherein the vinylidene chloride constitutes at least 70 per cent of the polymer, and from about 2 to about 7.5 per cent of a coumarone indene resin, based on the weight of the polymer.

EDGAR C. BRITTON.
HAROLD W. MOLL.